United States Patent
Heid

(10) Patent No.: US 10,388,937 B2
(45) Date of Patent: *Aug. 20, 2019

(54) BATTERY BUSHING WITH INTERNAL ANTI-TWIST PROTECTION

(71) Applicant: WEGMANN automotive GmbH & Co. KG, Veitshöchheim (DE)

(72) Inventor: Andreas Heid, Hausen bei Würzburg (DE)

(73) Assignee: WEGMANN AUTOMOTIVE GMBH & CO. KG, Veitshöchheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/896,364

(22) Filed: Feb. 14, 2018

(65) Prior Publication Data

US 2018/0175363 A1 Jun. 21, 2018

Related U.S. Application Data

(63) Continuation of application No. PCT/EP2016/069519, filed on Aug. 17, 2016.

(30) Foreign Application Priority Data

Aug. 20, 2015 (EP) .................................. 15181701

(51) Int. Cl.
*H01M 2/30* (2006.01)
*H01M 2/08* (2006.01)
(Continued)

(52) U.S. Cl.
CPC ............. *H01M 2/307* (2013.01); *H01M 2/08* (2013.01); *H01M 4/14* (2013.01); *B21D 22/00* (2013.01);
(Continued)

(58) Field of Classification Search
CPC .......... H01M 2/02; H01M 6/00; H01M 2/305; H01M 2/30; H01M 2/307; H01M 10/06;
(Continued)

(56) References Cited

U.S. PATENT DOCUMENTS

| 6,255,617 B1* | 7/2001 | Farmer | B23K 11/002 164/332 |
|---|---|---|---|
| 2004/0079738 A1* | 4/2004 | Sakamoto | H01M 2/307 219/121.82 |

(Continued)

FOREIGN PATENT DOCUMENTS

| CN | 102859745 A | 1/2013 |
| CN | 104813504 A | 7/2015 |

(Continued)

OTHER PUBLICATIONS

JP2009259541 MT.*

(Continued)

*Primary Examiner* — Alexander Usyatinsky
(74) *Attorney, Agent, or Firm* — Yakov S. Sidorin; Quarles & Brady LLP

(57) ABSTRACT

A battery bushing for rechargeable batteries has mounting and contacting sections and a torque ring between these sections. The torque ring or the outer surface can be endowed with several indentations. The mounting section is configured to hold the battery bushing within a battery cover, into which it is preferably injection molded. The battery bushing is a hollow body with outer and inner walls. At the contacting section, the outer wall is conically shaped. At the mounting section, the outer wall has at least one circumferential projection forming a labyrinth. The inner wall comprises at least an upper section, approximately surrounded by the contacting section and preferably having a conical shape, and a lower section approximately surrounded by the mounting section. The lower section preferably has (in a lateral sectional view) a concave shape. Between the upper and lower sections, there may be an edge or a step.

11 Claims, 10 Drawing Sheets

(51) Int. Cl.
  *H01M 4/14* (2006.01)
  *B21D 22/00* (2006.01)
  *H01M 2/02* (2006.01)
  *H01M 6/00* (2006.01)
  *H01M 10/06* (2006.01)

(52) U.S. Cl.
  CPC .............. *H01M 2/02* (2013.01); *H01M 2/30* (2013.01); *H01M 2/305* (2013.01); *H01M 6/00* (2013.01); *H01M 10/06* (2013.01); *Y10T 29/49108* (2015.01)

(58) Field of Classification Search
  CPC .......... H01M 2/08; H01M 4/14; B21D 22/00; Y10T 29/49108
  USPC ....................................................... 429/121
  See application file for complete search history.

(56) References Cited

U.S. PATENT DOCUMENTS

| | | | |
|---|---|---|---|
| 2008/0233779 A1* | 9/2008 | Gibellini | B21J 9/022 439/202 |
| 2010/0291435 A1* | 11/2010 | Garin | H01M 2/305 429/180 |

FOREIGN PATENT DOCUMENTS

| | | | |
|---|---|---|---|
| DE | 102010010722 A1 | | 8/2011 |
| DE | 102010010772 | * | 9/2011 |
| DE | 102010010772 A1 | | 9/2011 |
| GB | 2420300 | * | 5/2006 |
| GB | 2420300 A | | 5/2006 |
| JP | 2009-259541 | * | 11/2009 |
| JP | 2009259541 A | | 11/2009 |
| KR | 20100087934 | * | 1/2012 |
| KR | 1020120007263 A | | 1/2012 |
| WO | 2010127289 A1 | | 11/2010 |
| WO | WO 2010127289 | * | 11/2010 |
| WO | 2014198650 A1 | | 12/2014 |

OTHER PUBLICATIONS

DE102010010772 MT.*
Decision to grant Patent issued by EP Office dated Oct. 26, 2017.*
KR20100087934 Translation (2012) (Year: 2012).*
Office Action issued in related Chinese Application No. 201680043826.3, dated Oct. 9, 2018 (Year: 2018).*
Office Action issued in related Korean Patent Application, dated Aug. 16, 2018, 17 pages.
Office Action issued in related Chinese Application No. 201680043826.3, dated Oct. 9, 2018, 6 pages.

* cited by examiner

BATTERY BUSHING WITH INTERNAL ANTI-TWIST PROTECTION

CROSS-REFERENCE TO RELATED APPLICATIONS

This application is a continuation of International Application No. PCT/EP2016/069519 filed on Aug. 17, 2016, now published as WO 2017/029328, which designates the United States and claims priority from the European Application No. 15181701.2 filed on Aug. 20, 2015. The disclosure of each of the above-identified patent applications is incorporated herein by reference.

BACKGROUND

1. Field of the Invention

The invention relates to battery bushings, also called connecting poles, for rechargeable batteries, particularly for connecting poles of batteries, and specifically lead acid batteries, also referred to as rechargeable batteries. The invention also relates to covers for housings and/or housings of such batteries.

2. Description of Relevant Art

A battery bushing for a rechargeable batteries, which can be molded into the rechargeable batteries lid and which has a plurality of grooves forming a labyrinth seal, is disclosed in the European patent publication EP 0 601 268 B1.

The U.S. Pat. No. 7,517,610 B2 discloses a rechargeable battery having poles with a sliding element disposed within a lower section of the poles to simplify the insertion of a battery's pole shank by reducing the friction between the pole shank and the battery bushing. Notably, if this sliding element is integrally formed on the battery cover, injection molding of the battery cover is comparatively complex and requires expensive precision tools to form a thin sliding film at the inner side of a pole sleeve.

In the U.S. Pat. No. 6,030,723, a lead bushing is disclosed, which is connected to a terminal post of a battery with the help of a conductive adhesive. To simplify insertion of the terminal post into the lead bushing, the terminal post has a significantly smaller diameter than the lead bushing. The gap between the terminal post and the lead bushing is filled with the conductive adhesive.

The European patent application publication EP 2814077 A1 discloses a battery bushing for a rechargeable battery, which has a mounting section and a contacting section. There is a torque ring placed between the mounting section and the contacting section, which preferably contains tooth-shaped protrusions. The mounting section is configured to hold the battery bushing within a battery cover, into which the battery bushing is preferably injection molded.

DE 10 2010 033 645 A1 discloses a battery bushing for a rechargeable battery, which has a mounting section and a contacting section. There is a torque ring disposed between the mounting section and the contacting section, which has tooth-shaped protrusions. The mounting section is also tooth-shaped to facilitate holding the battery bushing within a battery cover (into which the battery bushing is, preferably, injection molded).

The US patent publication US 2011/0250493 A1 discloses a battery bushing for a rechargeable battery, which bushing has a mounting section and a contacting section. There is a torque ring present between the mounting section and the contacting section. Such torque ring has a groove and a step at the upper side of the torque ring. Notably, the presence of the groove causes notch stress to the material of the battery post and the material of the battery housing and, therefore, enables a premature failure. Furthermore, the torque ring comprises several recesses, which are not parallel to one another. This geometry makes the demolding process much more complicated and, understandably, requires a more complex and expensive molding tool.

The European patent application publication EP 1 347 522 A1 discloses, in FIG. 1, a battery bushing post with a circumferential section that has a saw tooth-shaped longitudinal profile. Such profile protrudes over the surface of the battery bushing post and generates notch stress. The saw tooth forms a step, which prevents a plane support for the injection molding tool.

GB 2 420 300 A discloses a method of manufacturing a lead terminal for an accumulator by plastic deformation on a cold-working apparatus that has a shaping station and at least one deformation station. The method includes shaping, at a shaping station, a slug that has a longitudinal extension along a longitudinal axis such as to provide base and contact parts for the terminal and a size commensurate with the size of the terminal end piece to be manufactured; transferring the slug to the deformation station; carrying out a first deformation of the slug for inner and outer shaping of its base part; and carrying out a second deformation of the slug for performing at least a further inner and outer shaping of the base part, the deformations being performed sequentially as progressive deformation steps.

JP2009259541 discloses a battery bushing for a lead-acid battery with the advantages of a reduced mass, reduced material cost, improved sealing and an improved anti-rotation protection.

The US patent application publication US 2010/0291435 A1 discloses a battery bushing with a base portion. The base portion has several internal and external torque resisting features and gripping features that are configured to resist twisting or loosening of the battery part with reference to the battery container material, as well as to prevent or inhibit fluid leakage from the battery container.

DE 10 2010 010 772 A1 discloses a connecting pole for a rechargeable battery. The connecting pole has a connecting section, in which a pole terminal can be attached to the connecting pole. The connecting pole has an attachment section, in which the connecting pole can be attached in a housing part of the battery. The attachment section has a labyrinth section. The outer wall of the connecting pole includes at least one circumferential projection in the labyrinth section. The circumference of outer wall of the connecting pole increases in the direction pointing away from the connecting section in a section of the labyrinth section which is not provided with a circumferential projection.

SUMMARY

The disclosed embodiments provide a battery bushing for rechargeable batteries, which possesses an improved sealing and improved mechanical stability. Furthermore, the battery bushing configured according to the embodiments allows easy assembly of the rechargeable batteries and inserting of the terminal post into the battery bushing during assembly with a low friction. With the use of the embodiments, the process of manufacturing the battery bushing and the process of injection-molding of a battery cover should be simplified and should be made more precise. The amount of material used for the battery bushing should be reduced.

In one embodiment, a battery bushing (preferably configured for use with a rechargeable battery) has a mounting section and a contacting section. There is an outer wall of the battery bushing between the mounting section and the contacting section, which outer wall contains several indentations. In an alternative embodiment, an annular base (which may be configured as a separate part or as a part of the outer surface) may have a plurality of indentations. The mounting base may be dimensioned to protrude from the outer wall.

The indentations, which also may be recesses or notches, may have various shapes. In one preferred embodiment, for example, the indentations have a shape dimensioned to ensure that the battery bushing can be demolded easily. Notch stress, caused by the presence of such recesses, may be reduced by rounding the corresponding edges. The form of the indentations may be adapted to the special requirements related to the encapsulation material (such as plastic, resins and/or metal, for example), or the mechanical requirements. An advantage of the use of indentations stems from the fact that the amount of material (which is needed for the production of a corresponding element) is reduced and the demolding is simplified. In a related embodiment, the indentations are oriented to be approximately parallel to one another. The approximately parallel indentations can be seen or perceived as slots that correspond approximately to the inner contour of one half of the two-part molding tool. This feature simplifies the production process such that only a two-part molding tool is now required, in advantageous contradistinction with the related art.

The battery bushing may be attached to the battery terminal post. After mounting the battery bushing, the bushing may at least partially be overmolded (encapsulated) with plastic or another appropriate material(s) so that the indentations are filled with such material. When so structured, the indentations may, therefore, act as a spin-lock, preventing the relative rotation of the part(s).

The mounting section is configured to hold the battery bushing within a battery cover, into which such bushing is, preferably, injection molded. The battery is externally connected by the contacting section. The battery bushing includes a hollow body, which has an outer wall and an inner wall. At the contacting section, the outer wall preferably is shaped conically, with a diameter decreasing towards the upper side of the battery bushing. At the mounting section, the outer wall preferably has at least one circumferential projection, or protrusion, forming a labyrinth type structure. The inner wall comprises at least two sections. An upper section of the inner wall is approximately surrounded by the contacting section, and, preferably, has a conical shape with a diameter decreasing towards the top side of the battery bushing. The upper section may also have a cylindrical shape. A lower section of the inner wall is approximately surrounded by the mounting section. The lower section preferably in a lateral sectional view (with a concave or conical shape), extends or increases in diameter in the direction towards the bottom side. Between the upper section and the lower section, there may be arranged an edge or a step at the inner wall of the battery bushing.

The lower section may have a straight or concave shape of the inner wall and can provide space for plastic material of the battery cover. While battery bushings known in the prior art are configured to be held, within the battery cover, only by their outer walls, this embodiment of a battery bushing is judiciously and completely embedded into the material of the battery cover in its mounting section (including the outer wall and the inner wall of the battery bushing) to provide and ensure enhanced stability to the battery bushing, which results in a significantly higher retention force in advantageous comparison with related art. This situation is not comparable to a situation involving thin sliding elements. To the contrary, the present embodiment contains a space for a significant layer of the battery cover's material covering the inner wall of the battery bushings mounting section. The thickness of the battery cover's material may be 1 mm or more, preferably 3 mm. For molding a battery bushing into a battery cover, a pin of a molding tool is inserted into the battery bushing to limit the flow of the battery cover's material within the battery bushing. A circular edge, formed at the inner wall of the battery bushing between the upper section and the lower section, is in contact with the pin of the molding tool and ensures sealing of the area into which the battery cover's material can flow. This configuration results in a clear, structurally well-defined limit to the battery cover's material against the lower section of the battery bushing.

The circular edge (at the inner wall of the battery bushing between the upper section and the lower section) preferably is pressed against the pin of the molding tool. To obtain a secure sealing, the dimension(s) of the pin of the molding tool must at least closely fit the diameter of the circular edge. The pin of the molding tool may also be pressed into the battery bushing, extending the inner diameter of the circular edge slightly. Therefore, it is preferred, if the circular edge is opposed to the protrusion at the outer wall of the battery bushing, as in this case the protrusion is configured to act as a reinforcement and to allow for absorbing of comparatively high forces without deformation of the battery bushing.

In a further embodiment, the mounting section has a decreasing material thickness starting from the torque ring to the end of the mounting section (that is, a thickness of material of the mounting section is decreasing from a location at the torque ring towards the end of the mounting section). A torque ring may also be called or referred to as anti-twist protection or distortion lock protection. As the possible holding forces decrease towards the end of the mounting section due to the anchoring forces of the circumferential projections, the thickness of the walls can be reduced, thus saving further material and mass.

Another embodiment relates to a rechargeable battery having at least one battery bushing as described herein.

The planar upper supporting surface of the torque ring acts as supporting surface for the molding tool. The planar supporting surface is configured to have a circular shape and no breakthroughs, as seen in a top view. During the production process, an injection molding tool fits to the planar upper supporting surface of the torque ring. The torque ring will be, in this case, injection molded with a molding material, for example a plastic material. The form-locking support, created between the molding tool and the planar upper support surface of the torque ring, prevents an overflow of the injection molding material. The planar upper supporting surface preferably has no irregularities and is flush with the surface of the injection molding tool.

The torque ring has a first section with a circular shape, which first section is oriented towards the contacting section and the first section has a circular planar supporting surface. The torque ring also has secondary section with a circular shape adjacent to the first section. This other section has an outer contour with indentations. Furthermore the torque ring comprises an additional auxiliary section adjacent to the secondary section and oriented towards the mounting section which has a planar surface towards the mounting section and a circular shape. The first section, the secondary section and the additional auxiliary section preferably have the same diameter.

BRIEF DESCRIPTION OF THE DRAWINGS

In the following, the implementations of the invention will be described by way of examples and embodiments, without limitation of the general inventive concept and with reference to the drawings.

Figure 1:
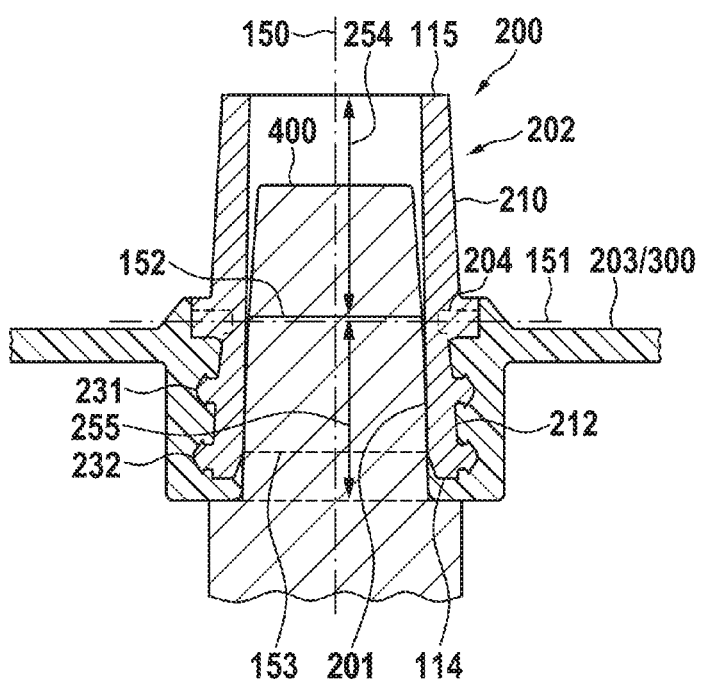
FIG. 1 shows an embodiment of a battery bushing in a sectional view when overmolded in the lid.

While the implementations of the invention can be modified and assume alternative forms, the specific examples of the embodiments are shown by way of example in the drawings and will herein be described in detail. It should be understood, however, that the drawings and related detailed description are not intended to limit the invention to any particular form disclosed, but to the contrary, the scope of the intention is to cover all modifications, equivalents and alternatives falling within the spirit and scope of the present invention as defined by the appended claims.

DETAILED DESCRIPTION

In FIG. 1, an embodiment of a battery bushing 200 is shown. The battery bushing 200 has a contacting section 210 configured to contact the battery to a vehicle or a formation connector, and a mounting section 212 configured to mount and hold the battery bushing 200 within a battery cover. Between the contacting section 210 and the mounting section 212 there is an annular base 204 with several indentation or recesses, which provides a high torque resistance to the battery bushing 200 through the encapsulation of material of the cover 300 or another encapsulation material 203, disposed to fill s the indentations. Preferably, the mounting section has at least one (preferably two) circumferential projection(s) 231, 232 dimensioned to extend the way of the acid and to operate as mechanical lock against (i.e., pre-venting) vertical movement. The battery bushing 200 preferably includes a hollow body, wherein most of the body, with exception of the torque ring, is rotationally symmetrical about a center axis 150. The torque ring may be symmetric with respect to the center axis. The battery bushing 200 has an inner wall 201 and an outer wall 202. Preferably, the upper section 254 has a slightly conical shape (the diameter of which is decreasing in a direction towards the top side 115 of the battery bushing 200). In an alternative embodiment, the inner wall 201 of the upper section 254 may be formed to be cylindrical. The lower section 255 may have a cross-section with dimension(s) that decrease from the first circular edge 152 towards the bottom side 114 of the battery bushing 200. The lower section 255 further may have a second circular edge 153 and a cone configured to improve the mountability.

Figure 2:
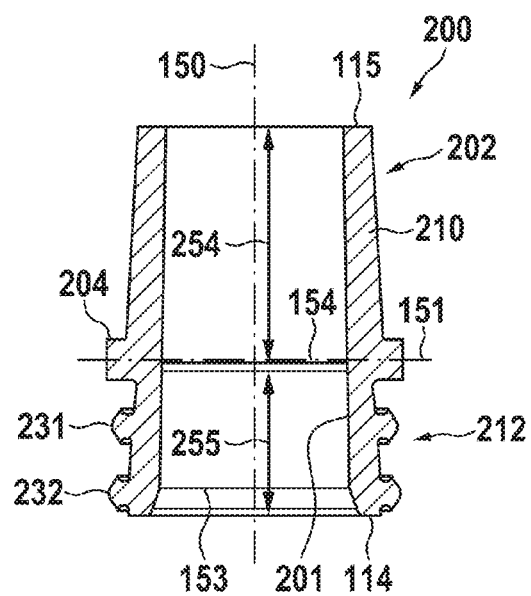
FIG. 2 shows the embodiment of a battery bushing in a sectional view.

In FIG. 2, a sectional view of a component of FIG. 1 is shown. Here, the mounting section 212 may have a coupling labyrinth structure formed with multiple (as shown—two) circumferential protrusions (or ribs, or rims) 231 and 232. The inner wall 201 has an upper section 254 and a lower section 255. As shown in this embodiment, between these sections 254, 255 there may be a circular edge 152 or a step 154. The circular edge 152 or the step 154 b is located opposite to the torque ring at the inner wall 201.

Figure 3:
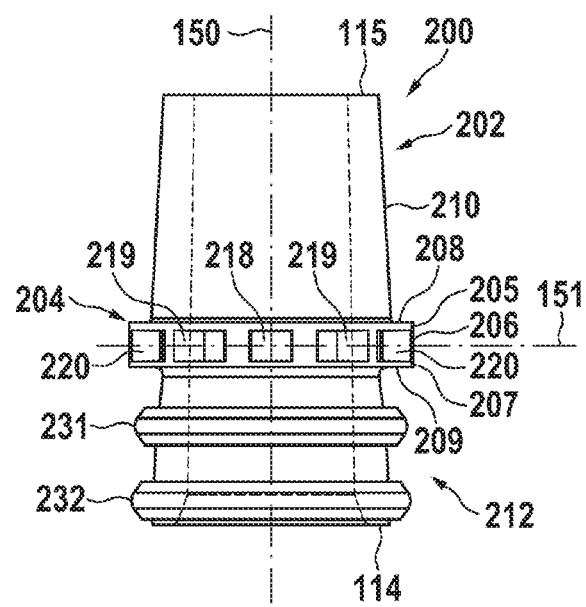
FIG. 3 shows the embodiment of a battery bushing in a side view.

In FIG. 3, a side view of the embodiment of FIG. 2 is shown. The torque ring 204 has several indentations or recesses 218, 219, 220. The indentations preferably have a parallel orientation 218, 219, 220. The torque ring 204 has a first section 205 with a circular shape which is oriented towards the contacting section 210. The torque ring 204 has a circular first planar supporting surface 208. A second section 206 of the torque ring 204 has a circular shape and is adjacent to the first section 205. This section 206 is oriented towards the mounting section or portion 212. The section 206 has an outer contour having indentations 218, 219, 220. Furthermore the torque ring 204 comprises another section 207 that is adjacent to the section 206 and oriented towards the mounting section 212. The section 207 has a second circularly shaped planar surface 209 facing towards the mounting section 212. The section 205, the section 206 and the section 207 preferably all have the same diameter.

Figure 4:
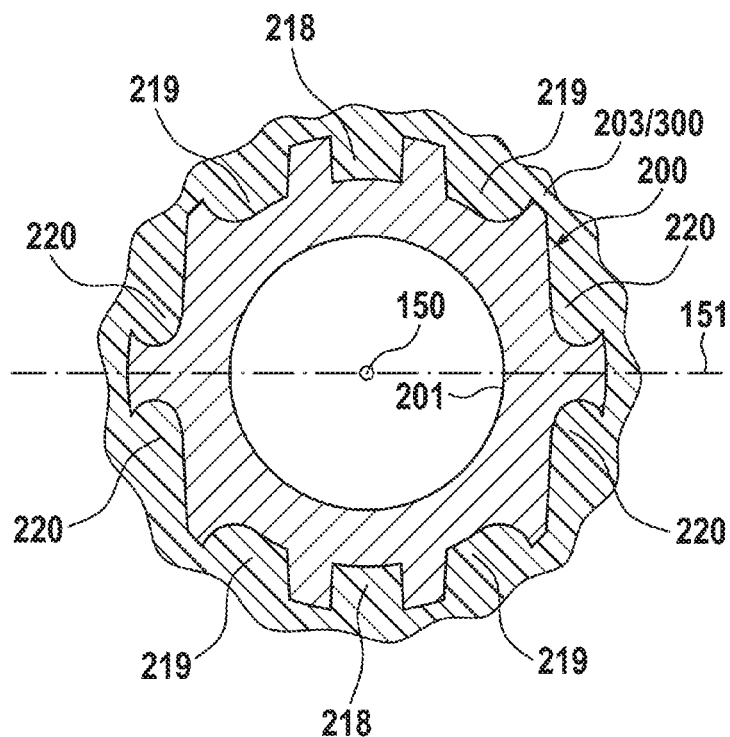
FIG. 4 shows a sectional view of an embodiment when overmolded in the lid.

In FIG. 4 sectional view at a cutting plane 151 is shown. The torque ring 204 has several indentations or recesses 218, 219, 220. The indentations are filled with plastic material 203 or with the material of the battery cover 300. Preferably, the form of the indentations is nearly symmetric with respect to the center axis 150.

Figure 4A:
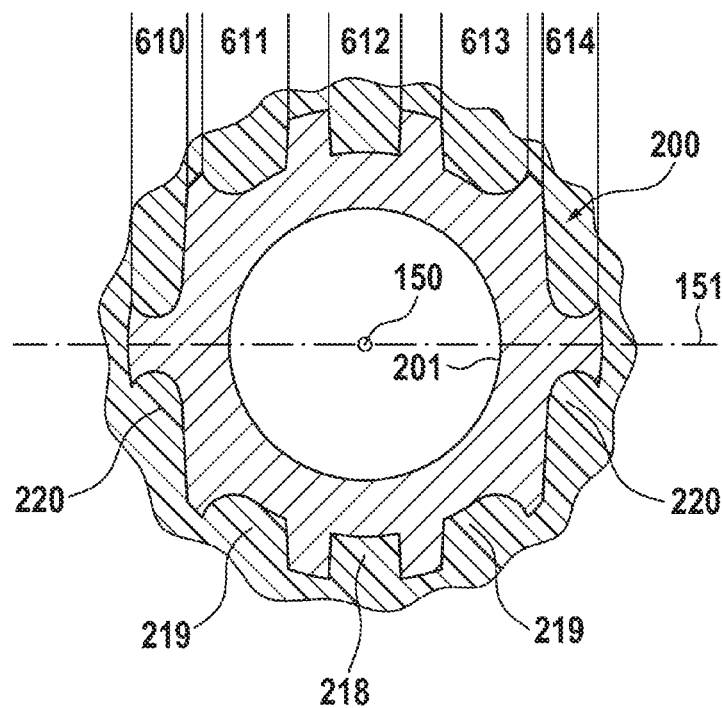
FIG. 4a shows a sectional view of an embodiment when overmolded in the lid several parallel slots.

FIG. 4a refers to the embodiment of FIG. 4 and shows a first slot 610, a second slot 611, a third slot 612, a fourth slot 613 and a fifth slot 614 as extension(s) of the recesses 218, 219, 220. The slots are approximately parallel to one another. The slots 610 through 614 are dimensioned to correspond approximately to the form and/or shape of one half of a two-part molding tool that is used during the production process.

Figure 5:
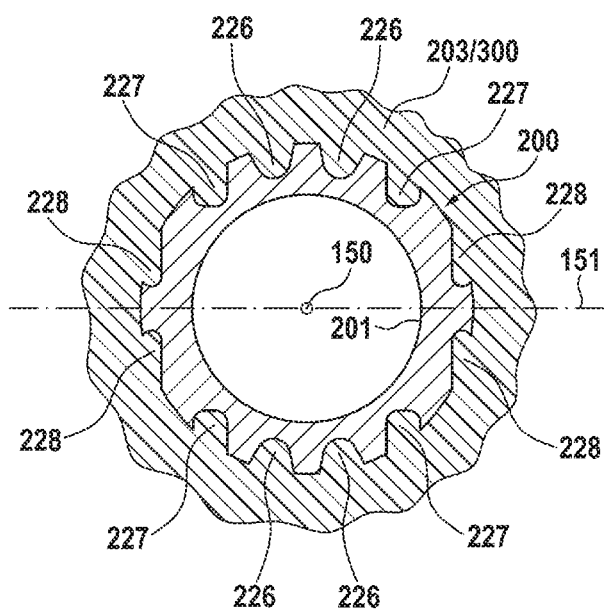
FIG. 5 shows a surface cut of another related embodiment when overmolded in the lid.

In FIG. 5, a sectional view at a cutting plane 151 of a further embodiment is shown. The torque ring 204 has several indentations 226, 227, 228, which are filled by some plastic material 203 or the material of the battery cover 300.

Figure 6:
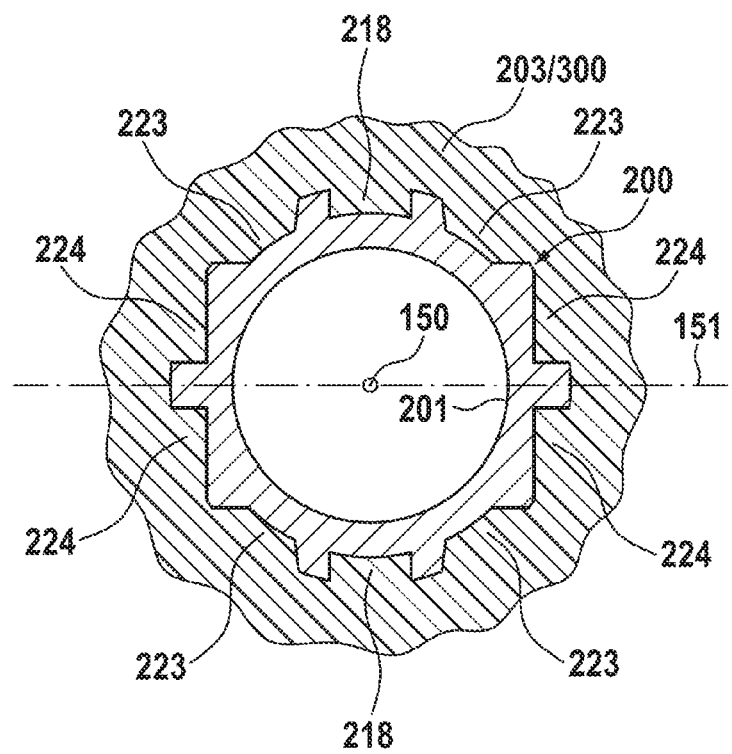
FIG. 6 shows a surface cut of another related embodiment when overmolded in the lid.

In FIG. 6, a surface cut at a cutting plane 151 of another embodiment is shown. The torque ring 204 is endowed with several indentations 223, 224 that are filled by some plastic material 203 or by the material of the battery cover 300.

Figure 7:
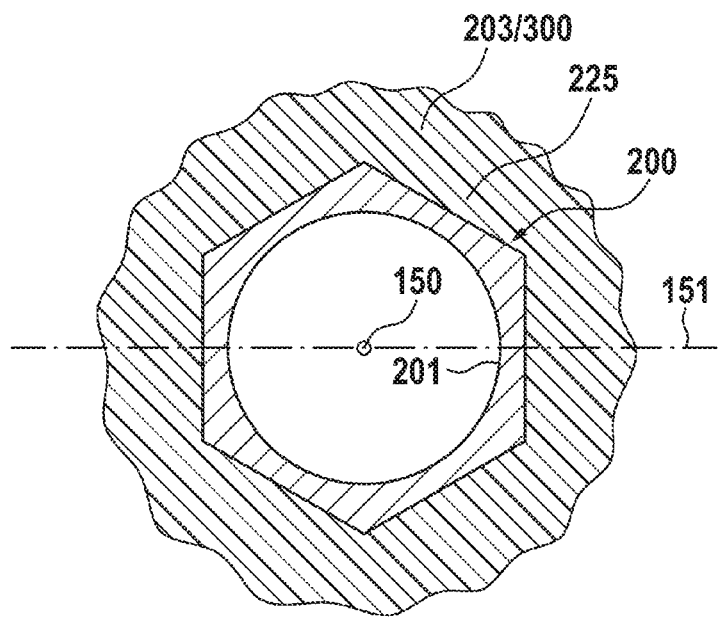
FIG. 7 shows a surface cut of another related embodiment when overmolded in the lid.

In FIG. 7, a surface cut at a cutting plane 151 of yet another embodiment is shown. The torque ring 204 of this embodiment has a hexagonal shape.

Figure 8:
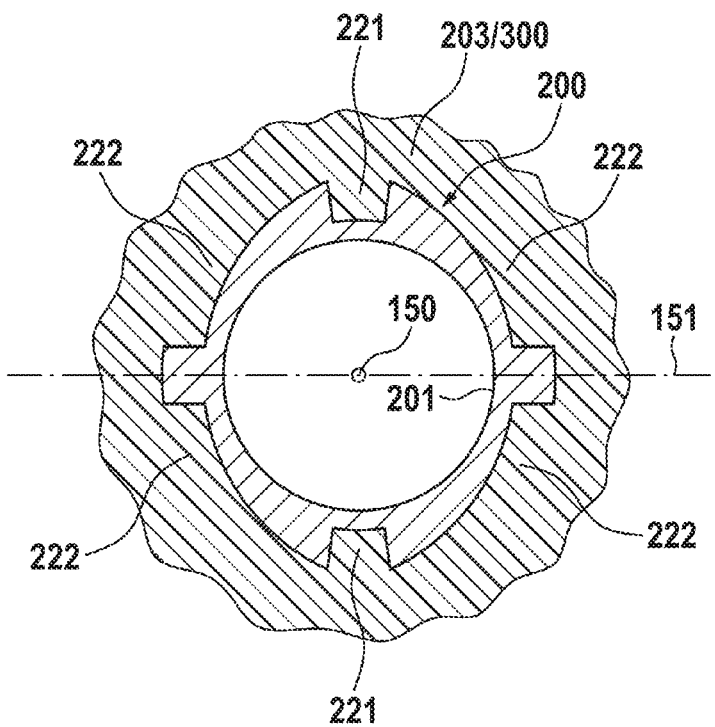
FIG. 8 shows a surface cut of another related embodiment when overmolded in the lid.

In FIG. 8, a cutting plane 151 of a further embodiment is shown. Here, the torque ring has a plurality of indentations 221 and slopes 222.

Figure 9:
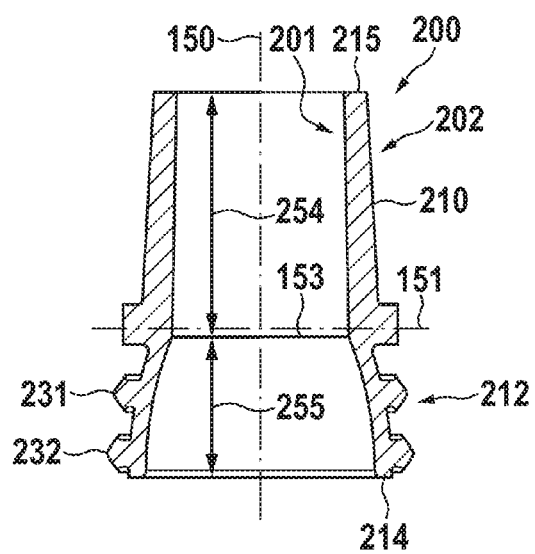
FIG. 9 shows a related embodiment of a battery bushing in a sectional view with a concave shape of the lower section.

FIG. 9 shows another embodiment with a torque ring at the outer wall 202 and the lower section 255 that has a concave shape from the circular edge 152 or step to the bottom side 214 of the battery bushing 200 to the circular edge 152 or step 154.

Figure 10:
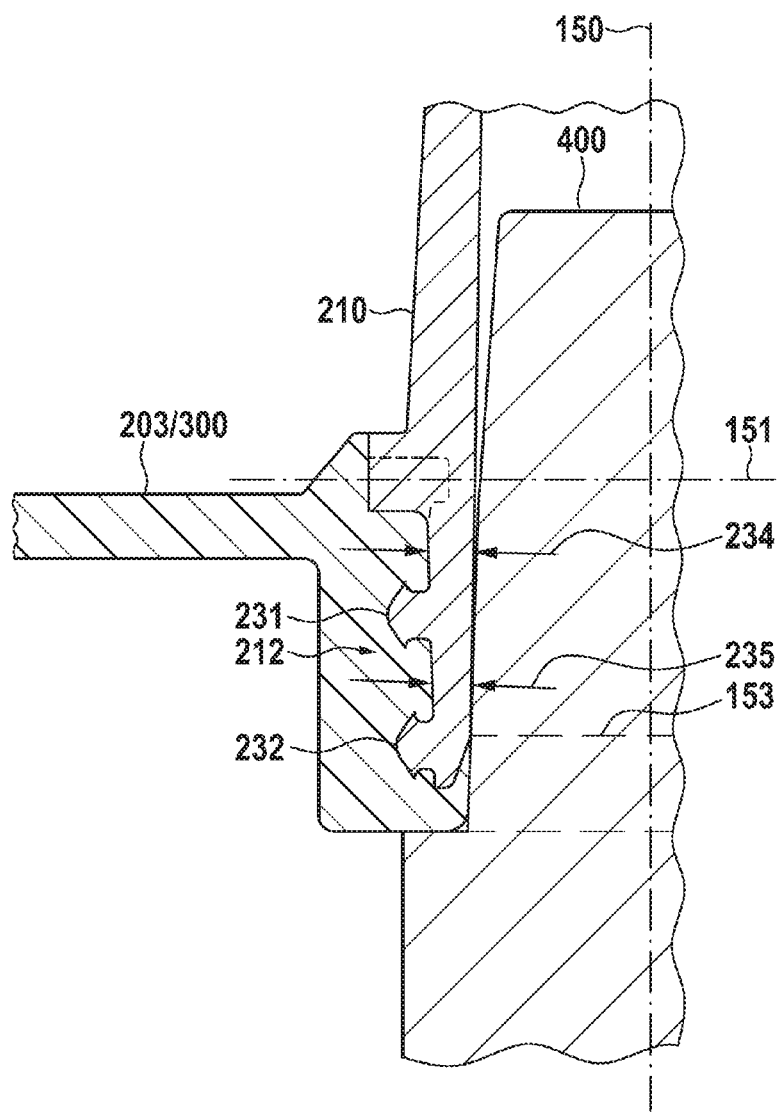
FIG. 10 shows a detailed view of an embodiment of a battery bushing in a sectional view when overmolded in the lid.

In FIG. 10, a sectional view of another embodiment of the battery bushing 200 is shown. Here again, a pin of a molding tool 400 is shown inserted (for the purposes of illustration). Due to the complete enclosure of the mounting section 212 by the material of the battery cover 300 or the encapsulation material 203, the thickness of the walls can be advantageously decreased. Therefore, it is preferred, if the thickness 234 of the wall at a first location between the torque ring and the first circumferential protrusion 231 is bigger than the thickness 235 of the walls at a point between the first circumferential protrusion 231 and the second circumferential protrusion 232. The maximum thickness of the material of the battery cover at the inner wall of the battery bushing 200 is determined by the shape of the lower section and the pin of the molding tool. Such maximum value of thickness is preferably in the range between 1 mm and 5 mm, most preferably 2 mm to 3 mm.

Figure 11:
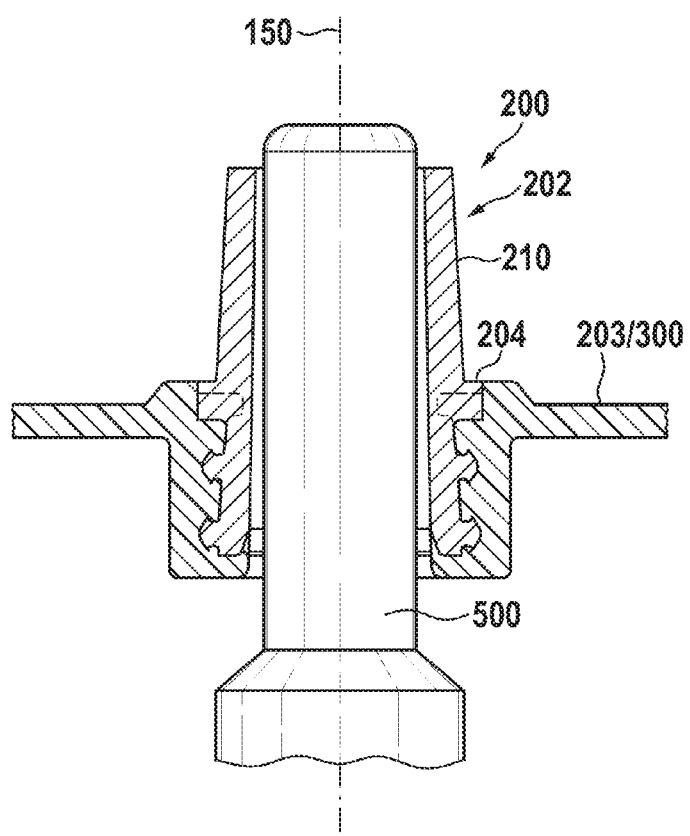
FIG. 11 shows an embodiment of a battery bushing in a sectional view when overmolded in the lid with a battery terminal post.

In FIG. 11, an embodiment of the battery bushing 200 within inserted battery terminal post 500 is shown. The battery terminal post 500 is connected to the battery cells, which are located to the bottom side and not shown for the simplicity of illustration. At its top side, the terminal post will be heated to melt together with the battery bushing 200 and to obtain and result in a gas-tight and electrically-secure connection. The terminal post 500 has a diameter, which is slightly smaller than the inner diameter of the terminal. Preferably, the terminal post 500 has a cylindrical shape with a diameter that is smaller than the smallest diameter of the inner wall of the battery bushing. Most preferably, the diameter of the terminal 500 post is by about 0.5 mm to 3 mm smaller than the diameter of the circular edge of the battery bushing 200.

Figure 12:
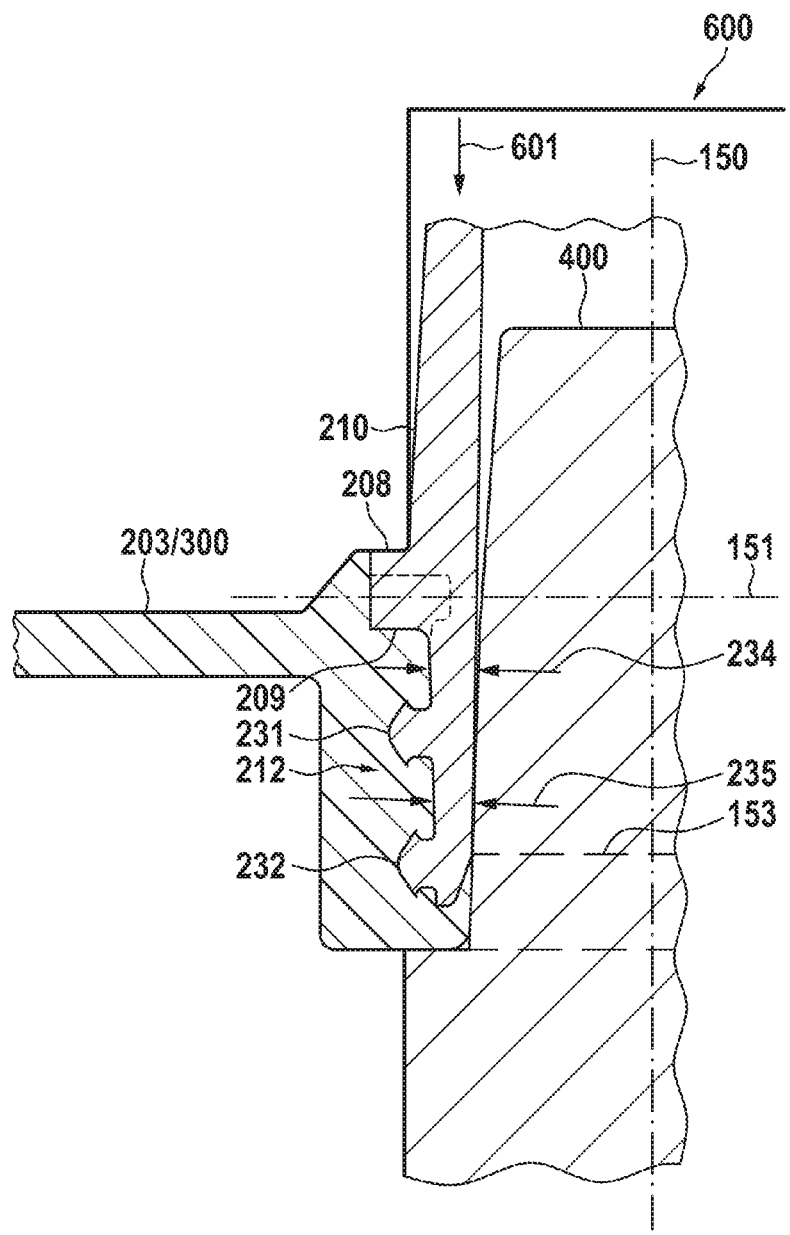
FIG. 12 shows an embodiment of a battery in a sectional view during the installation process with the therefore needed injection molding tool.

In FIG. 12, a sectional view of an embodiment of the battery bushing 200 is shown. Here again, a pin of a molding tool 400 is shown inserted (for demonstration purposes) and an injection molding tool is set on the contacting section 210. The first planar upper supporting surface 208 of the torque ring 204, which protrudes over the contacting section 201, is in contact with the molding tool 600. This contact prevents an outflow of injection molding material, for example plastic.

It will be appreciated by those skilled in the art having the benefit of this disclosure that this invention is believed to provide battery bushings for rechargeable batteries. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 114 bottom side
115 top side
150 center axis
151 cutting plane
152 first circular edge
153 second circular edge
154 step
200 battery bushing
201 inner wall
202 outer wall
203 plastic material
204 torque ring
205 first section
206 second section
207 third/auxiliary section
208 first planar upper supporting surface of the torque ring
209 second planar surface of the torque ring
210 contacting section
212 mounting section
214 bottom side of the battery bushing
215 upper side of the battery bushing
218 indentations of the torque ring
219 indentations of the torque ring
220 indentations of the torque ring
221 indentations of the torque ring
222 slope of the torque ring
223 indentations of the torque ring
224 indentations of the torque ring
225 hexagonal shape of the torque ring
226 indentations of the torque ring
227 indentations of the torque ring
228 indentations of the torque ring
231 first circumferential projection/protrusion
232 second circumferential projection/protrusion
234 thickness of wall between the torque ring and the first circumferential protrusion
235 thickness of wall between the first and second circumferential protrusions
240 arch-shaped cross section
241 arch-shaped cross section
254 upper section
255 lower section
300 battery cover
400 pin of a molding tool
500 battery terminal post
600 Injection molding tool
601 contact pressure
610 first slot
611 second slot
612 third slot
613 fourth slot
614 fifth slot

The invention claimed is:

1. A battery bushing for a battery,
the battery bushing comprising a hollow body,
the hollow body comprising an outer wall and an inner wall, a mounting section, a contacting section, and a torque ring at the outer wall between the mounting section and the contacting section, the outer wall comprising at least one circumferential protrusion at the mounting section, said at least one circumferential protrusion forming a labyrinth, the inner wall comprising an upper section and a lower section, the upper section being surrounded by the contacting section, the lower section being surrounded by the mounting section and having a diameter that expands towards a bottom side of the battery bushing, wherein the torque ring includes:

a first section having a first circular planar supporting surface oriented towards the contacting section, an auxiliary section having an auxiliary circular planar surface oriented towards the mounting section, and a second section between the first section and the auxiliary section, the second section having an outer contour with indentations, wherein diameters of the first section, the second section, and the auxiliary section are equal to one another.

2. The battery bushing according to claim 1, wherein at least two indentations, from the indentations of the outer contour, are parallel slots.

3. The battery bushing according to claim 1, wherein the torque ring protrudes from the outer wall.

4. The battery bushing according to claim 1, wherein the indentations extend into the outer wall.

5. The battery bushing according to claim 1, wherein the upper section has a conical shape or a cylindrical shape, and wherein, when the upper section has the conical shape, a diameter of the upper section decreases towards a top side of the battery bushing.

6. The battery bushing according to claim 1, wherein the mounting section has a concave shape or a conical shape, and wherein a diameter of the mounting section expands towards a bottom side of the battery bushing.

7. The battery bushing according to claim 1, wherein the inner wall of the torque ring forms a circular step or a circular edge.

8. The battery bushing according to claim 1, wherein a thickness of material forming the mounting section decreases starting at a first position, defined at a location of the torque ring, toward a second position defined at an end of the mounting section.

9. A rechargeable battery having at least one battery bushing according to claim 1.

10. The rechargeable battery according to claim 9, having a battery cover and wherein the at least one battery bushing is molded into the battery cover.

11. The rechargeable battery according to claim 9, wherein the at least one battery bushing is overmolded with a plastic material.

\* \* \* \* \*